Patented Apr. 25, 1939

2,155,477

UNITED STATES PATENT OFFICE 2,155,477

PROCESS FOR THE MANUFACTURE OF SALTS BY BASE EXCHANGE BY MEANS OF ZEOLITE

Maxence Drujon, Aix-en-Provence, France

No Drawing. Application April 26, 1937, Serial No. 138,999. In France May 8, 1936

1 Claim. (Cl. 23—64)

According to the invention there is provided a process for the manufacture of alkaline metal salts and salts of magnesium which consists in dissolving magnesium oxide in water charged with carbonic acid gas under pressure and causing the solution to be passed over an alkali zeolite under pressure, the salt of magnesium being obtained when the zeolite is regenerated.

The zeolite must be of such a quality that it resists the carbonic acid.

The process may be carried out as follows:

Carbonate of magnesium is practically insoluble in pure water, but after calcination, the magnesium oxide is placed in water charged with carbonic acid gas under pressure, whereupon there occurs dissolution of important quantities of magnesium in the form of bicarbonate and the water thus charged with bicarbonate or magnesium is sent under pressure into a column of sodium or potassium zeolite at the discharge from which it is charged with bicarbonate of sodium or potassium.

The carbonic acid gas in excess is recuperated after permutation and is returned to the manufacturing circuit.

The column of zeolite is regenerated by a solution of chloride or sulphate of sodium or potassium and the chloride or sulphate of magnesium resulting from the regeneration is collected.

I claim:

Process for the simultaneous manufacture of alkaline metal salts and magnesium salts which consists in dissolving calcined magnesium oxide in water charged with carbonic acid gas under pressure, passing the solution while maintaining said pressure over alkaline zeolite, and regenerating the zeolite to recover the magnesium salts.

MAXENCE DRUJON.